April 14, 1953  J. MAHO  2,634,672
AERATED STORAGE CHAMBER FOR GRANULOUS GOODS
Filed Oct. 22, 1949

INVENTOR.
Jacques Maho
BY Richardson, David & Nordon
HIS ATT'YS

Patented Apr. 14, 1953

2,634,672

UNITED STATES PATENT OFFICE 2,634,672

AERATED STORAGE CHAMBER FOR GRANULOUS GOODS

Jacques Maho, Larchmont, N. Y., assignor of one-half to Leo Littmann, Unterhaching, near Munich, Germany Application October 22, 1949, Serial No. 122,953

2 Claims. (Cl. 98—55)

The present invention relates to storage chambers for granulous goods, such as cereals, for example, and more particularly to storage chambers of this character in which air under pressure is circulated through the stored goods for the ventilating and conditioning thereof.

Conventional means for the handling and storage of grain involve a preliminary drying treatment with heated air which requires transportation of the grain from the drying kiln or similar apparatus to the storage chamber.

Among the objects of the present invention is the provision of a storage chamber in which the stored material may be subjected to continuous or intermittent aeration, as desired, either with air or any other gas without the necessity for handling the stored material.

A further object of the invention is the provision of a storage chamber of this character in which the stored goods may be ventilated throughout a complete transverse layer, the position of the aerated layer being adjustable.

Still another object of the invention is to provide a storage chamber in which converging air currents penetrate the stored goods to the center of the storage chamber in order that the entire volume of the goods may be treated uniformly.

Another object of the invention is to provide a storage chamber of this character in which the walls of the storage chamber are perforated substantially throughout their entire area so that the circulating air or other gas will have the maximum degree of access to the stored goods and so that the pressure required to produce the desired circulation will be held to a minimum.

A further object of the invention is to provide a storage chamber of this character in which the perforated wall is an inner wall in direct contact with the stored goods and is completely surrounded by an imperforate outer wall spaced from the inner wall, the space between the two walls forming a duct for the circulating air.

A further object of the invention is to provide such a storage chamber in which segmented blocking means is disposed intermediate the spaced inner and outer walls, the segments being movable together to provide for the aeration of a complete transverse layer of the stored goods determined by the position of the blocking means.

Still a further object of the invention resides in the provision of guide means for the segmented blocking means, the guide means extending between the inner and outer walls.

A feature of the invention resides in the fact that aeration may take place whenever desired. This permits the selection of a time when atmospheric conditions are the most suitable, thereby avoiding the necessity for treatment of the circulating air by heating or dehydration. This feature also permits the storage of the grain immediately after harvesting, the necessary drying taking place within the storage chamber.

Other and further objects will become apparent upon reading the following specification together with the accompanying drawing forming a part hereof.

Referring to the drawing.

Figure 1:
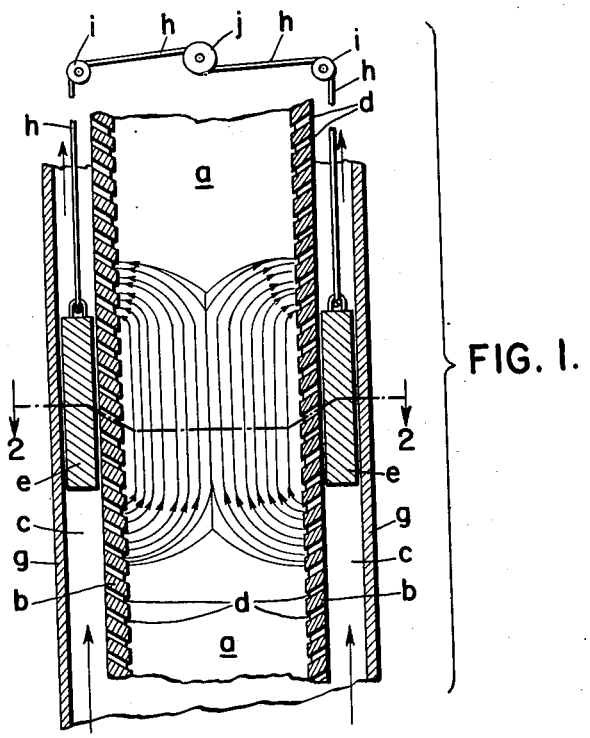
Fig. 1 is a fragmentary sectional view in elevation of a storage chamber embodying the invention.

Referring to Fig. 1, the storage chamber provides a storage compartment $a$ defined by an inner lateral wall $b$ which is externally surrounded by an air duct $c$. The inner wall $b$ has downwardly directed perforations $d$ formed therein substantially throughout its entire area.

Figure 2:
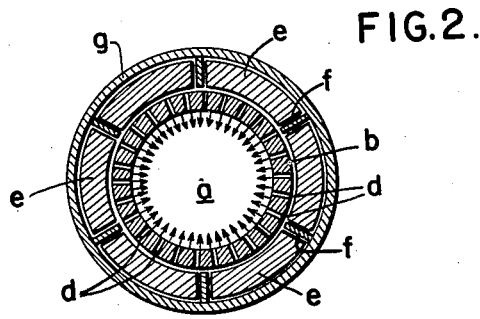
Fig. 2 is a plan sectional view taken along the line 2—2 of Fig. 1.

Disposed adjacent to the external surface of the inner wall $b$ is segmented blocking means $e$. As shown in Fig. 2, guide means $f$ for the blocking means $e$ extends between adjacent segments thereof. An outer wall $g$ completely surrounds the inner wall $b$ and is spaced therefrom, the space between the inner and outer walls forming the duct $c$ in which the segmented blocking means $e$ is disposed.

Each segment of the blocking means $e$ is shown supported by an individual rope $h$ which passes over a pulley $i$ at the top of the storage chamber and extends to a winding drum $j$, the drum $j$ being common to all of the ropes $h$ so that all the segments of blocking means $e$ will be raised and lowered together and they will thus always be maintained at the same height. It will be noted that the guide means $f$ extends between the inner wall $b$ and the outer wall $g$ and facilitates the upward and downward movement of several segments of the blocking means $e$.

The cross-sectional configuration of the storage chamber may take any desired shape. In Fig 2, the cross-section is shown illustratively as being circular and the segments of the blocking means $e$ are arcuate in shape to conform to the curvature of the inner and outer cylindrical walls $b$ and $g$, respectively. In Fig. 2, the guide means $f$ is shown extending radially between the inner and outer walls.

In operation, air or some other gas under pressure is taken from some suitable source (not shown) and is introduced into the space c between the inner and outer walls at the bottom of the storage chamber. The air passes upwardly until it reaches the blocking means e. At this point, it is compelled to enter the perforations d in the inner wall b and travels inwardly, the path of travel being indicated by the arrows in Fig. 1. The air currents entering the storage chamber a from its periphery, converge at its center and travel upwardly, emerging from the storage chamber a through the perforations d located above the blocking means e. Complete aeration of a layer of the stored goods determined by the position of blocking means e is thus effected. By rotation of the common winding drum j the ropes h may be wound or unwound to raise or lower the several segments of the blocking means e, as desired, and thereby change the position of the completely aerated layer within the stored goods.

Having thus described my invention, I claim:

1. An aerated storage chamber for granulous goods comprising: an inner lateral wall having perforations therein substantially throughout its entire area; an outer lateral wall spaced from said inner wall and completely surrounding said inner wall; vertically movable blocking means comprising a plurality of segments disposed in the space between said walls; means for raising and lowering said segments together so that they will be maintained at the same height; guide means for said segments extending between said inner and outer walls; means for introducing air under pressure between said walls; and means for exhausting air from between said walls, said blocking means being disposed intermediate said introducing and exhausting means.

2. A storage chamber according to claim 1, wherein said inner and outer walls are cylindrical, and said guide means extends radially between said wall and intermediate said segments, said segments being of arcuate shape to conform to the curvature of said walls.

JACQUES MAHO.

References Cited in the file of this patent

UNITED STATES PATENTS

| Number | Name | Date |
|---|---|---|
| 120,109 | Sampson | Oct. 17, 1871 |
| 1,929,084 | Strub | Oct. 3, 1933 |

FOREIGN PATENTS

| Number | Country | Date |
|---|---|---|
| 494,117 | Great Britain | Oct. 20, 1938 |
| 534,505 | Germany | Sept. 26, 1931 |
| 767,583 | France | May 1, 1934 |